Patented Mar. 17, 1936

2,033,909

UNITED STATES PATENT OFFICE 2,033,909

MANUFACTURE OF CALCIUM LEVULINATE

Gerald J. Cox and Mary L. Dodds, Pittsburgh, Pa., assignors, by mesne assignments, to Niacet Chemicals Corporation, New York, N. Y., a corporation of New York No Drawing. Application December 19, 1934,
Serial No. 758,266

3 Claims. (Cl. 260—112)

This invention relates to the manufacture of calcium levulinate and particularly to an improved and more economical method of preparing a salt adapted for injection of calcium in the treatment of certain pathological conditions and for other uses.

Calcium levulinate is well known, but the methods of preparation heretofore in use are not economical. One method is the neutralization of pure levulinic acid with pure calcium hydroxide and involves a tedious and expensive purification of the levulinic acid by distillation. Distillation results in losses due to the destruction of some of the acid and to the failure to recover all of the acid available because of the nature of the contaminating materials. It has been proposed also to produce calcium levulinate from crude levulinic acid and to purify the salt thereafter by crystallization from water and alcohol solutions. The latter method is unsatisfactory because of the practical impossibility of eliminating a colored substance from the crystals, which substance is objectionable particularly where the product is utilized for medical purposes.

It is the object of the present invention to provide a simple and effective method of producing pure calcium levulinate, avoiding the difficulties and disadvantages of known methods and affording particularly a more economical procedure.

Other objects and advantages of the invention will be apparent as it is better understood by reference to the following specification, in which we have described the preferred procedure.

In carrying out our invention, we employ pure esters of levulinic acid. These may be produced by the method described by us (J. Am. Chem. Soc. Vol. 55, pp. 3391–3394, August 1933, co-pending application Ser. No. 758,267, filed December 19, 1934, relating to Manufacture of esters of levulinic acid) in which we esterify crude levulinic acid without initial purification of the acid. We have produced by that method esters of various alcohols including methyl, ethyl, n-propyl, 2-methylbutyl, isopropyl, isobutyl, sec-butyl, n-amyl, isoamyl, methylpropylcarbinol, and diethylcarbinol. Such esters are readily purified and are available, therefore, for the purpose of the present invention.

By hydrolyzing such esters with a suspension of calcium hydroxide in boiling water, we can readily obtain calcium levulinate and free alcohol. The alcohol is completely eliminated by distillation, and the excess of insoluble calcium hydroxide is removed by filtration. Soluble calcium hydroxide is precipitated with carbon dioxide, and the precipitate is removed by filtration. The resulting solution contains calcium levulinate in a pure form and can be concentrated or diluted for use. Such solutions are adapted for parenteral administration of calcium in human subjects and for other purposes. The solutions may be dispensed in ampoules or in any other suitable containers.

The calcium levulinate can also be recovered in crystallized form from the solution, and in that form is adapted for storage. It is readily soluble in water to produce solutions of the desired concentration.

Other salts such as those of magnesium and sodium can be produced by substitution from calcium levulinate. Solutions of such salts may be used in the manner described, where it is desirable to administer the elements contained in the salts.

As an example of the invention, we describe the procedure which is applicable generally to the production of calcium levulinate from various esters. One mole of butyl levulinate (172 grams) is treated with an excess of calcium hydroxide (obtained from 70 grams of U. S. P. calcium oxide) suspended in two liters of water. The mixture is boiled until hydrolysis is complete. The reaction usually does not require more than about 20 minutes. The solution is then concentrated to about 1 liter. During this concentration all of the butyl alcohol is distilled from the solution. The excess of insoluble calcium hydroxide is filtered from the solution, and the filtrate is treated at the boiling temperature with a stream of carbon dioxide until all of the calcium present as calcium hydroxide is precipitated as the carbonate. The solution is again filtered and brought to a volume of about 1 liter. An analysis of the solution shows that practically a 100% yield is obtained based on the amount of ester used. By further concentration and crystallization, calcium levulinate in the form of pure white crystals is obtained.

While butyl levulinate is readily available and is adapted to the practice of the invention, other esters such as methyl, ethyl and n-amyl levulinate may also be used. The reaction is in fact general, and any of the esters hereinbefore described can be employed in accordance with the procedure described to produce pure calcium levulinate.

Various changes may be made in the procedure without departing from the invention or sacrificing any of the advantages thereof.

We claim:
1. The method of preparing calcium levulinate which consists in hydrolyzing an ester of levulinic acid with calcium hydroxide.
2. The method of preparing calcium levulinate which consists in hydrolyzing an ester of levulinic acid with calcium hydroxide in a hot water suspension.
3. The method of preparing calcium levulinate which consists in hydrolyzing an ester of levulinic acid with calcium hydroxide and separating the alcohol formed and unreacted calcium hydroxide from the solution.

GERALD J. COX.
MARY L. DODDS.